United States Patent
Pirrung et al.

(10) Patent No.: US 7,595,416 B2
(45) Date of Patent: Sep. 29, 2009

(54) PHOSPHORIC ACID ESTERS AND THEIR USE AS WETTING AND DISPERSING AGENT

(75) Inventors: Frank Oliver Heinrich Pirrung, Weil am Rhein (DE); Arend Noordam, Oranjewoud (NL); Petrus Johannes Harbers, Sintjohannesga (NL); Elizabeth Maaike Loen, Leeuwarden (NL); Arona Eliane Munneke, Heerhugowaard (NL)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 363 days.

(21) Appl. No.: 10/590,467

(22) PCT Filed: Feb. 28, 2005

(86) PCT No.: PCT/EP2005/050830

§ 371 (c)(1),
(2), (4) Date: May 15, 2007

(87) PCT Pub. No.: WO2005/085261

PCT Pub. Date: Sep. 15, 2005

(65) Prior Publication Data

US 2007/0293692 A1 Dec. 20, 2007

(30) Foreign Application Priority Data

Mar. 8, 2004 (EP) .................... 04100927

(51) Int. Cl.
*C07F 9/02* (2006.01)
(52) U.S. Cl. ....................... 558/70; 523/160
(58) Field of Classification Search .......... None
See application file for complete search history.

(56) References Cited

U.S. PATENT DOCUMENTS 5,130,463 A  7/1992  Haubennestel et al. ...... 558/172

FOREIGN PATENT DOCUMENTS

EP  0 417 490  3/1991

*Primary Examiner*—David Wu
*Assistant Examiner*—Vu Nguyen
(74) *Attorney, Agent, or Firm*—Joseph C. Suhadolnik

(57) ABSTRACT

The invention relates to a phosphoric acid ester and salts thereof of the general formula (I), wherein A is a monohydroxyl residue derived from $C_1$-$C_{20}$-alkyl-(AO)x-OH or Acyl-(AO)x-OH; or $C_1$-$C_{20}$-alkyl-(AO)x-(HA)y-OH or Acyl-(AO)x-(HA)y-OH; or $C_1$-$C_{20}$-alkyl-(AO)x-(AA-AO)y-OH or Acyl-(AO)x-(AA-AO)y-OH; or MO-(HA)y-OH or MO-(AA-AO)y-OH; wherein Acyl is an aromatic carboxylic acid residue or a saturated or unsaturated fatty acid residue; AO is a poly$C_2$-$C_4$alkyleneglycol residue, HA is a hydroxycarboxylic acid or a lactone thereof, AA is a dicarboxylic acid, MO is a monoalcohol, x is 1 to 250, y is 1 to 250, B is a mono-, di-, or tri- or polyhydroxy di-, tri or multi-carboxylic acid residue which is linked via the hydroxy group to the phosphoric acid and via one of the carboxylic acid groups to the monohydroxyl residue [A], the remaining carboxyl acid group(s) is/are free or is/are esterified with a further monohydroxyl residue [A], resulting in branched esters; n is 1-2; m is 1-4. The phosphoric acid esters are used as wetting agent or dispersants.

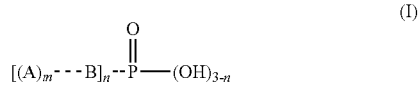

(I)

13 Claims, No Drawings

PHOSPHORIC ACID ESTERS AND THEIR USE AS WETTING AND DISPERSING AGENT

This invention relates to phosphoric acid esters and their salts and to the use of these phosphoric acid esters and salts as dispersants.

To introduce solid substances, such as pigments, into liquid media, high mechanical forces are necessary. This depends to a large extent on the solid substance's wet ability by the surrounding medium, as well as on the affinity for this medium. In order to reduce these dispersing forces, it is conventional to use dispersing agents, which facilitate incorporating the substances. This mostly concerns surface-active agents or surfactants, of anionic or cationic or non-ionic structure. In relatively low amounts of addition, these agents are either applied directly to the solid substance or added to the dispersing medium. Through such a surfactant, the energy required for the dispersion is considerably reduced.

Further, it is known that such solid substances, after dispersion, tend to reagglomerate, which nullifies the initially induced dispersing energy and leads to serious problems. This phenomenon can be explained by inter alia London/van der Waals' forces, by which the solid substances are mutually attracted. In order to nullify these attractive forces, adsorption layers should be provided on the solid substances. This occurs through the use of such surfactants or polymers.

During and after the dispersion, however, there arises an interaction of the surrounding medium with the solid particle, so that desorption of the surfactant can arise in exchange for the surrounding medium present in a higher concentration. However, in most cases this surrounding medium is incapable of building up such stable adsorption layers, so that the entire system flocculates. This is evidenced by inter alia an increase of the viscosity in liquid systems, loss of gloss, color shifts in paints and coatings, insufficient development of coloring power in pigmented plastics and lacquers, as well as a decrease of the mechanical strength in reinforced plastics.

The European Patent EP 0417 490 B1 (Byk-Chemie) describes phosphoric acid esters and their salts corresponding to the formula $(HO)_{3-n}$—PO—$(OR)_n$ wherein R is an aliphatic, cycloaliphatic and/or aromatic residue containing at least one ether oxygen (—O—) and at least one carboxylic acid ester group (—COO—) and/or urethane group (—NH-COO—) without Zerewitinoff hydrogen. As an example a compound of the following formula: Alkyl-$[O(CH_2)_x]_z$—$[O-C=O(CH_2)_x]_y$—O—P=$O(OH)_2$ is disclosed.

The European Patent EP765356 B1 (Zeneca) describes a dispersant obtainable by reacting a polyethylene glycol with a hydroxycarboxylic acid and/or with an alkylene oxide to form a polymeric diol and phosphating the diol.

Phosphoric acid esters having a free carboxyl group, or phosphoric acid esters which are branched via the free carboxylic acid group are not described.

It is an object of the present invention to provide a dispersant having improved dispersing properties for organic and inorganic pigments, as well as for fillers and extenders in aqueous and non-aqueous systems.

The invention relates to a phosphoric acid ester and salts thereof of the general formula I,

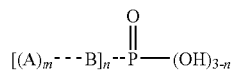

wherein
A is a monohydroxyl residue;
B is a mono-, di-, tri- or polyhydroxy di-, tri- or multi-carboxylic acid residue which is linked via the hydroxy group to the phosphoric acid and via one of the carboxylic acid groups to the monohydroxyl residue [A], the remaining carboxylic acid group(s) is/are free or is/are esterified with a further monohydroxyl residue [A], resulting in branched esters;
n is 1-2;
m is 1-4.

An essential feature of the inventive phosphoric acid esters is the presence of a mono-, di-, tri- or polyhydroxy di-, tri- or multi-carboxylic acid residue [B].

With regard to [B] it is important that either at least one free carboxylic acid group is present or that at least one branching center results by esterifying the free carboxylic acid.

If a tri- or multi-carboxylic acid is chosen, two or more free carboxylic acid groups are present. It is possible that the free carboxylic acid groups remain free, are fully esterified resulting in branched compounds or are partly esterified resulting in branched compounds having a free carboxylic acid group. The free carboxylic groups can be transformed into a salt in all cases.

The mono-, di-, tri- or polyhydroxy di-, tri- or multi-carboxylic acid [B] to be used may, for example, be tartaric acid, malic acid, citromalic acid (2-methylmalic acid), 3-hydroxy-3-methylglutaric acid, 5-hydroxyisophthalic acid, ascorbic acid or citric acid, preferably malic acid (hydroxybutane dicarboxylic acid) or citric acid.

A multi-carboxylic acid is any acid that comprises more than three carboxylic acid groups, e.g. hydroxy benzene-1,2,4,5-tetracarboxylic acid.

The monohydroxyl residue [A] may comprise a polyether chain, a polyester chain or a mixed polyether-polyester chain, whereby the respective groups can be arranged in blocks or randomly.

Preferably [A] comprises a poly$C_2$-$C_4$alkylene glycolmonoether and/or a poly$C_2$-$C_4$alkylene glycol monoester of a carboxylic acid.

Suitable poly$C_2$-$C_4$alkylene glycolmonoethers are $C_1$-$C_{20}$alkylethers, preferably methylethers (MePEG), (MePPG), butylethers (BuPPG), alkylphenol ethers (APE), $C_{12}$-$C_{20}$ fatty alcohol ethers or $C_{10}$-$C_{15}$ oxoalcohol ethers.

Poly$C_2$-$C_4$alkylene glycol esters of carboxylic acids are, for example, poly$C_2$-$C_4$alkylene glycol monolaurate, poly$C_2$-$C_4$alkylene glycol monostearate, poly$C_2$-$C_4$alkylene glycol monooleate, and poly$C_2$-$C_4$alkylene glycol benzoate.

The poly$C_2$-$C_4$alkylene glycolmonoether and/or the poly$C_2$-$C_4$alkylene glycol monoester may be esterified with [B] or may be linked to [B] via polyester units derived from a hydroxy-carboxylic acid or a lactone thereof [HA] and/or via units derived from a dicarboxylic acid [AA] which is linked to a diol with a $C_2$-$C_4$-alkylene oxide [AO] structure.

Thus, the following monohydroxyl compounds [A] may be obtained

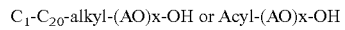

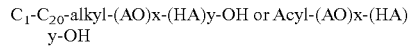

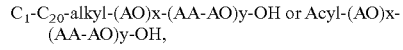

wherein
$C_1$-$C_{20}$-alkyl is a straight chain or branched hydrocarbon residue, acyl is an aromatic carboxylic acid residue such as, for example, a benzoic acid residue or a saturated or unsaturated fatty acid residue such as, for example, lauric acid, myristic acid, stearic acid, arachic acid, oleic acid, linoleic acid and the like, AO is a polyC$_2$-C$_4$alkyleneglycol residue such as, for example, polyethylene glycol (PEG), polypropylene glycol (PPG), polybutylene glycol, including a block copolymer of ethylene oxide and propylene oxide, HA is a hydroxycarboxylic acid or a lactone thereof such as, for example, lactic acid, glycolic acid, 6-hydroxyhexanoic acid, 12-hydroxystearic acid, 12-hydroxydodecanoic acid, 5-hydroxydodecanoic acid, 5-hydroxydecanoic acid, 4-hydroxydecanoic acid, or lactones such as β-propiolactone, γ-butyrolactone, δ-valerolactone or ε-caprolactone, including a block copolymer such as, for example, of ε-caprolactone/δ-valerolactone, AA is a dicarboxylic acid such as, for example succinic acid, maleic acid, malonic acid, glutaric acid, adipic acid, phthalic acid, sebacic acid, oxalic acid, diglycolic acid and acid anhydrides thereof, x is 1 to 250, preferably 2 to 50, more preferably 5 to 15,
y is 1 to 250, preferably 2 to 50, more preferably 2 to 15.

It is also possible to start the polyester unit with a monoalcohol suitably with 4 to 30, preferably with 4 to 20 carbon atoms, such as n-butanol and 2-ethyl-1-hexanol, cetylalcohol, oleyl alcohol, linoloyl alcohol, oxo alcohols, cyclohexanol, phenol, phenyl ethanol and benzylalcohol.

Thus, the following monohydroxyl compounds [A] may be obtained

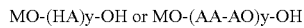

wherein
MO is a monoalcohol as described above,
HA is a hydroxycarboxylic acid or a lactone thereof as described above,
AA is a dicarboxylic acid as described above,
AO is a polyC$_2$-C$_4$alkyleneglycol residue as described above.

Further units may be included in the monohydroxyl compound [A] such as urethane or amide units/functional groups.

The ratio of the molecular weight of unit [A] to [B] is 1.5:1 to 8:1, preferably 2:1 to 5:1.

The preferred phosphoric acid esters are those derived from Me-PEG-OH having a molecular weight from 250 to 750. It is also preferred that ε-caprolactone is present as hydroxy carboxylic acid. The preferred hydroxy-dicarboxylic acid is malic acid.

The phosphoric acid ester of the formula I can be made by known esterification reactions. A polyalkylene glycolether, preferably Me-PEG-OH is reacted at elevated temperatures, for example at 100-250° C., with a mono-, di-, tri- or polyhydroxy di-,tri- or multicarboxylic acid in the presence of an esterification catalyst such as, for example, dibutyl tin dilaurate, tetra-alkyltitanate, p-toluene sulfonic acid or ferrous acetylacetonate.

If a hydroxycarboxylic acid unit is present, such as, for example, caprolactone, polyalkylene glycolether is first esterified with the hydroxycarboxylic acid and then with the mono-, di-, tri- or polyhydroxy di-, tri- or multi-carboxylic acid.

The catalyst is generally used in an amount of 0.005-0.5 mole per 100 moles of the hydroxy di- or tricarboxylic acid. An inert solvent may be added, however, the esterification takes place preferably in the absence of a solvent.

Phosphoric acid esters of the formula I are obtained by reaction of one of the hydroxyl groups of the mono-, di-, tri- or polyhydroxy di-,tri- or multi carboxylic acid residue of the block copolymer obtained above with a phosphorus compound which forms phosphoric esters, in a manner known per se. The phosphorus compound is preferably a polyphosphoric acid or P$_2$O$_5$. If P$_2$O$_5$ is used as phosphoric acid a mixture of the mono- and di-ester is obtained.

Salts of the phosphoric acid ester can be obtained by neutralisation with an alkali hydroxide, with ammonia, with an amine, an alkanol amine or a quaternary ammonium compound.

It is another aspect of the invention to provide mixtures of the phosphoric acid esters of the formula I with phosphoric acid esters of polyC$_2$-C$_4$alkylene glycolmonoethers and/or a polyC$_2$-C$_4$alkylene glycol monoester of a carboxylic acid or with other commercially available wetting and dispersing agents such as for example with EFKA-5066, EFKA-5070, EFKA-5207, EFKA-5244, EFKA-6220, EFKA-6225, EFKA-6230, EFKA-8503, EFKA-8510, EFKA-8511, EFKA-8530, EFKA-8531, EFKA-8532 and the like.

Preferred are mixtures of the phosphoric acid esters of the formula I with phosphoric esters of polyC$_2$-C$_4$alkylene glycolmonoethers in wt ratio of 0.01 to 99.99; preferably 10 to 90, more preferably 50 to 50.

The invention also relates to the use of the phosphoric acid esters of the formula I as dispersants and as dispersion stabilizers. The dispersants according to the invention can be used for the production of water- and solvent-based coatings and printing inks. Those dispersants, which are not water-soluble, may have a self-emulsifying effect in water, so that these are suitable for use in water- and solvent-based coatings and printing inks as well. Alternatively, they can be made fully water-soluble by neutralising the phosphoric and carboxylic ester groups by alkali hydroxides, like potassium hydroxide solution, or amines like ammonia, dimethylethanolamine and the like. The neutralisation degree is 0.5 to 2 equivalents of neutralising agent per dispersant, preferably 0.8 to 1.5 equivalents of neutralising agent. In this connection water- and solvent-based coatings and printing inks, as used herein, also refer to those products, which partially comprise organic cosolvents. Pigments used in this field are the organic and inorganic pigments insoluble in the employed liquid, e.g., soot, polycyclic pigments, iron oxides, etc.

The dispersants according to the invention can also be employed in the production of resins comprising solids such as pigments, fillers and fibres. Such systems are known as sheet moulding compounds (SMC) or bulk moulding compounds (BMC) and are based on unsaturated polyester resins. In the state of the art, these systems must contain a high loading of such solids (typically >250 phr) in order to achieve the desired physical properties of the final product. Due to the high viscosity caused by the high solids load, insufficient wetting of the reinforcing fibres and air entrapment is observed. The use of the dispersants, according to the invention, lead to a sufficient reduction in viscosity to enhance wetting of the fibres at such high filler grades.

Examples of extenders and fillers which can be dispersed are, for example, calcium carbonate, alumina, aluminium trihydroxide (ATH), sand, china clay, talc, kaolin, silica, barytes and chalk, glass fibers, glass beads or metal powders.

It is obvious and conventional to the skilled worker that these examples represent merely a selection of the possibilities, which exist and are in no way to be regarded as a limitation.

EXPERIMENTAL

General Procedure for Phosphoric Ester Preparation and Examples

Example 1

Procedure A, Phosphoric Ester A: Me-(EO)$_7$-MA-P

Under a nitrogen atmosphere, polyethyleneglycol monomethylether (MPEG 350, MW 350, 65.3 g, 1 equivalent) and malic acid (25.0 g, 1 equivalent) were placed in a reactor at room temperature and heated to 180° C. Two drops of dibutyl tin dilaurate were added as esterification catalyst. During several hours, reaction water was removed from the reactor until an acid value of 105-115 mg KOH/g was reached. Subsequent cooling of the light yellow liquid to 60° C. was followed by slow addition of polyphosphoric acid (tetraphosphoric acid (PPA 116), 20.8 g, 0.33 equivalents) under vigorous stirring. This mixture was stirred at 100° C. for one hour. No solvent was added during the whole process. Phosphoric ester A was obtained as a clear, viscous, yellowish liquid at room temperature.

Example 2

Procedure B, Phosphoric Ester B-1: Me-(EO)$_7$—CL$_2$-MA-P

Under a nitrogen atmosphere, polyethyleneglycol monomethylether (MW 350, 44.4 g, 1 equivalent) and caprolactone (28.3 g, 2 equivalents) were placed in a reactor at room temperature and heated to 180° C. Two drops of dibutyl tin dilaurate were added as esterification catalyst. The reaction mixture was stirred for a few hours until a solid content of >98% was reached.

The reaction mixture was cooled to 140° C., and malic acid (16.6 g, 1 equivalent) was added. Subsequently, the reaction mixture was heated to 180° C. and during several hours, reaction water was removed from the equipment until an acid value of 60-70 mg KOH/g was reached. Subsequent cooling of the light yellow liquid to 60° C. was followed by slow addition of polyphosphoric acid (tetraphosphoric acid, 13.8 g, 0.33 equivalents) under vigorous stirring. This mixture was stirred at 100° C. for one hour. No solvent was added during the whole process. Phosphoric ester B was obtained as a clear, viscous, orange liquid, which slowly solidified at room temperature.

Example 3

Procedure B, Phosphoric Ester B-2: Me-(EO)$_7$—CL$_4$-MA-P

Under a nitrogen atmosphere, polyethyleneglycol monomethylether (MW 350, 44.4 g, 1 equivalent) and caprolactone (56.6.3 g, 4 equivalents) were placed in a reactor at room temperature and heated to 180° C. Two drops of dibutyl tin dilaurate were added as esterification catalyst. The reaction mixture was stirred for a few hours until a solid content of >98% was reached.

The reaction mixture was cooled to 140° C., and malic acid (16.6 g, 1 equivalent) was added. Subsequently, the reaction mixture was heated to 180° C. and during several hours, reaction water was removed from the equipment until an acid value of 50-60 mg KOH/g was reached. Subsequent cooling of the light yellow liquid to 60° C. was followed by slow addition of polyphosphoric acid (tetraphosphoric acid, 13.8 g, 0.33 equivalents) under vigorous stirring. This mixture was stirred at 100° C. for one hour. No solvent was added during the whole process. Phosphoric ester B was obtained as a clear, viscous, orange liquid, which slowly solidified at room temperature.

Example 4

Procedure C, Phosphoric Ester C: Me-(EO)$_7$—CL$_2$-CA-P

Under a nitrogen atmosphere, polyethyleneglycol monomethylether (MW 350, 43.3 g, 1 equivalent) and caprolactone (28.3 g, 2 equivalents) were placed in a reactor at room temperature and heated to 180° C. Two drops of dibutyl tin dilaurate were added as esterification catalyst. The reaction mixture was stirred for a few hours until a solid content of >98% was reached.

The reaction mixture was cooled to 140° C., and citric acid (23.8 g, 1 equivalent) was added. Subsequently, the reaction mixture was heated to 180° C. and during several hours, reaction water was removed from the reactor until an acid value of 130-140 mg KOH/g was reached. Subsequent cooling of the light yellow liquid to 60° C. was followed by slow addition of polyphosphoric acid (tetraphosphoric acid, 13.8 g, 0.33 equivalents) under vigorous stirring. This mixture was stirred at 100° C. for one hour. No solvent was added during the whole process. Phosphoric ester C was obtained as a clear, viscous, brownish liquid at room temperature.

Example 5

Procedure D (Me-(EO)$_7$)-2-MA-P

As procedure A or B, but with a ratio of 2 equiv of polymeric monoalcohol to 1 equiv of malic acid, fully esterified in the first step.

Example 6

In a similar way the following products were prepared:

| P-ester | Procedure | Raw materials* | (MW) | Equivalents |
|---|---|---|---|---|
| D (yellow liq) | D | Me-PEG-OH | 500 | 2 |
| E (yellow liq) | A | Me-PPG-OH | 200 | 1 |
| F (yellow liq) | A | Bu-PPG-OH | 1100 | 1 |
| G (orange liq) | B | 2-Ethyl-1-hexanol | 130 | 1 |
|  |  | Caprolactone/ |  | 2:3 |
|  |  | Valerolactone |  |  |
| H (white solid) | B | Cetyl alcohol | 242 | 1 |
|  |  | Caprolactone |  | 7 |
| J-1 | C | Me-PEG-OH | 350 | 2 |
| (off-white paste) |  | Caprolactone |  | 6 |
| J-2 | C | Me-PEG-OH | 350 | 3 |
| (yellowish paste) |  | Caprolactone |  | 9 |

-continued

| P-ester | Procedure | Raw materials* | (MW) | Equivalents |
|---|---|---|---|---|
| J-3 (yellowish liq) | C | Me-PEG-OH | 350 | 2 |
| J-4 (brownish liq) | C | Me-PEG-OH | 350 | 3 |

*PEG: polyethylene glycol
*PPG: polypropylene glycol

Example 7

Phosphoric Ester J-1: (Me-(EO)$_7$—CL$_2$)$_2$-CA-P

As procedure C, but with a ratio of 2 equiv of polymeric monoalcohol to 1 equiv of citric acid, fully esterified in the first step.

Example 8

Phosphoric Ester J-2: (Me-(EO)$_7$—CL$_2$)$_3$-CA-P

As procedure C, but with a ratio of 3 equiv of polymeric monoalcohol to 1 equiv of citric acid, fully esterified in the first step.

Example 9

Phosphoric Ester J-3: (Me-(EO)$_7$)$_2$—CA-P

As procedure C, but with a ratio of 2 equiv of MPEG 350 to 1 equiv of citric acid, fully esterified in the first step.

Example 10

Phosphoric Ester J-4: (Me-(EO)$_7$)$_3$—CA-P

As procedure C, but with a ratio of 3 equiv of MPEG 350 to 1 equiv of citric acid, fully esterified in the first step.

Example 11

Procedure K, Phosphoric Ester K

Under a nitrogen atmosphere, polyethyleneglycol monomethylether (MW 350, 35 g, 1 equivalent), adipic acid (36.5 g, 2.5 equivalents) and dipropyleneglycol (33.5 g, 2.5 equiv) were placed in a reactor at room temperature and heated to 190° C. Two drops of dibutyl tin dilaurate were added as esterification catalyst. Reaction water was removed from this mixture during 6 hours. The resulting yellowish liquid was cooled to 140° C. and further reacted with malic acid (13.4 g, 1 equiv) and polyphosphoric acid (11.0 g, 0.33 equiv) as indicated in procedure B. Phosphoric ester K was a dark yellow liquid at room temperature.

Example 12

Procedure L, Phosphoric Ester L

Mixture of Phosphoric Acid Esters

Under a nitrogen atmosphere, polyethyleneglycol monolaurate (MW 600, 24 g, 1 equiv) and caprolactone (13.7 g, 3 equiv) were placed in a reactor at room temperature and heated to 180° C. Two drops of dibutyl tin dilaurate were added as esterification catalyst. The reaction mixture was stirred for a few hours until a solid content of >98% was reached. The reaction mixture was cooled to 140° C., and malic acid (5.36 g, 1 equiv) was added. Subsequently, all was heated to 180° C. and during several hours, and reaction water was removed from the reactor until an acid value of 50-60 mg KOH/g was reached. The contents of the reactor were cooled down to 60° C., and polyethylene glycol monoalkyl ether (Lutensol TO 8™ (BASF) MW ca. 540, 21.6 g, 1 equiv) was added. After homogeneous stirring, this was followed by slow addition of polyphosphoric acid (Tetraphosphoric acid, 9.05 g, 0.66 equivalents) under vigorous stirring. The resulting mixture was stirred at 100° C. for one hour. Phosphoric ester L was obtained as a clear, viscous, yellowish liquid that solidified to a slightly yellow paste at room temperature.

Example 13

Procedure M

As procedure A or B. Instead of polyphosphoric acid, phosphorous pentoxide was used in the last step of the synthesis (1 equiv on 3 equiv of polymeric monoalcohol) to obtain the 1:1 mixture of the mono and the diphosphoric esters. Reaction conditions: addition of P$_2$O$_5$ at 50° C. to the monoalcohol under vigorous stirring, followed by slow increase of temperature to 80° C. and stirring for 1 hour.

| P-ester | Procedure | Raw materials* | (MW) | Equivalents |
|---|---|---|---|---|
| M (light brown liq) | M | Me-PEG-OH | 500 | 1 |
| N (white paste) | M | Me-PEG-OH | 350 | 1 |
| | | Caprolactone | | 2 |
| O (yellowish solid) | M | 1-Dodecanol | 186 | 1 |
| | | Caprolactone | | 3 |

*PEG: polyethylene glycol

Example 14

Phosphoric Ester P

Phosphoric ester B (100 g, MW ca. 775, 1 equiv) was dispersed in 125 ml of demineralized water alt room temperature. To this mixture, a KOH solution (25% in water, 26 g, 0.9 equiv) was slowly added during 30 minutes, while the temperature rose to 40° C. The resulting clear solution was stirred for another 30 minutes at 40° C. This yielded phosphoric ester P (potassium salt of B) as a slightly yellowish liquid with 41% of solid content (Mettler Halogen dryer, 150° C., 0.5 g).

Example 15

Phosphoric Ester Q

Under a nitrogen atmosphere, phosphoric ester B (80 g, MW ca. 775, 1 equiv) was dispersed in 100 ml of demineralized water at room temperature. To this mixture, N,N-dimethyl ethanolamine (8.3 g, 0.9 equiv) was slowly added during 1 hour, while the temperature rose to 35° C. The resulting clear solution was stirred for 30 minutes at 40° C. This yielded phosphoric ester Q (ammonium salt of B) as a yellowish liquid with 42% of solid content (Mettler Halogen dryer, 150° C., 0.5 g).

Application Example

The following formulations were prepared:

| Formulation 1 | | |
|---|---|---|
| Laropal A81 60% | 19.41 wt % | (grinding resin BASF) |
| Solvesso 100 | 05.15 wt % | (aromatic hydrocarbon solvent Exxon) |
| MPA | 05.15 wt % | (methoxypropylacetate, solvent, Kluthe) |
| Saci 300 A | 01.00 wt % | (antisettling agent, Stoney Creek Technologies, LLC) |
| Kronos 2310 | 67.93 wt % | (titanium dioxide, Kronos) |
| Glassbeads 3 mm | 100.0 wt % | (grinding aid) |
| Phosphoric ester | 01.36 wt % | |

Preparation: the samples according to above formulation were shaken in a glass bottle for 1 hour on a Skandex of Fluid Management. The samples were then cooled down to room temperature for 24 h, before the rheology was measured on a Haake RS 600 Rheometer.

| Formulation 2 | | |
|---|---|---|
| MEG | 04.75 wt % | (Mono ethylene glycol) |
| Dem. Water | 16.88 wt % | |
| Bentone EW | 00.20 wt % | antisettling agent, Rheox Inc.,) |
| AMP 90 | 00.15 wt % | (amine neutralisation, Angus Chemie) |
| EFKA-2550 | 00.20 wt % | (defoamer, EFKA Additives) |
| Parmetol A 28 S | 00.20 wt % | (fungicide, Schulke & Mayr GmbH) |
| Kulubrite 5 | 76.19 wt % | (CaCO$_3$, Idwala Ind. Holdings (Pty) Ltd.) |
| Phosphoric ester | 01.43 wt % | |

Preparation: the samples according to above formulation were dispersed with a dissolver at 4000 rpm for 2 minutes. Subsequently the samples were cooled to room temperature for 24 h and measured on a Haake Rheometer RS 600.

The viscosity measurements are performed at a shear rate between 5 and 50 [1/s]

| Formulation 1 | | | | |
|---|---|---|---|---|
| | Viscosity mPas | | | |
| shear rate | 5/sec | 10/sec | 20/sec | 50/sec |
| Example 5 | 5560 | 2954 | 1672 | 843 |
| Example 10 | 5169 | 2734 | 1566 | 791 |
| BYK W 9010 | 6869 | 4420 | 2313 | 1223 |
| Example 1 | 10731 | 6630 | 3701 | 1767 |
| Example 2 | 17510 | 8640 | 4831 | 2122 |
| Example 9 | 8883 | 4901 | 2767 | 1327 |
| Disperbyk 110 | 21947 | 10520 | 5743 | 2629 |

BYK-W 9010 is a cdispersant according to EP 417 490
Disperbyk 110 is a dispersant according to EP 417 490

| Formulation 2 | | | | |
|---|---|---|---|---|
| | Viscosity mPas | | | |
| shear rate | 5/sec | 10/sec | 20/sec | 50/sec |
| Example 2 | 2875 | 1270 | 960 | 850 |
| Example 3 | 1522 | 910 | 668 | 523 |
| Example 4 | 4426 | 2910 | 1930 | 1340 |
| BYK W 9010 | 16390 | 9270 | 5350 | 2910 |

BYK W 9010 is a dispersant according to EP 417 490

The invention claimed is:

1. A phosphoric acid ester and salts thereof of the general formula I,

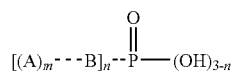

wherein
  A is a monohydroxyl residue derived from
    $C_1$-$C_{20}$-alkyl-(AO)x-OH or Acyl-(AO)x-OH; or
    $C_1$-$C_{20}$-alkyl-(AO)x-(HA)y-OH or Acyl-(AO)x-(HA)y-OH; or
    $C_1$-$C_{20}$-alkyl-(AO)x-(AA-AO)y-OH or Acyl-(AO)x-(M-AO)y-OH; or
    MO-(HA)y-OH or MO-(AA-AO)y-OH; wherein
      Acyl is an aromatic carboxylic acid residue or a saturated or unsaturated fatty acid residue;
      AO is a poly$C_2$-$C_4$alkyleneglycol residue,
      HA is a hydroxycarboxylic acid or a lactone thereof,
      AA is a dicarboxylic acid,
      MO is a monoalcohol,
      x is 1 to 250,
      y is 1 to 250,
  B is a mono-, di-, tri- or polyhydroxy di-, tri- or multicarboxylic acid residue which is linked via the hydroxy group to the phosphoric acid and via one of the carboxylic acid groups to the monohydroxyl residue [A], the remaining carboxylic acid group(s) is/are free or is/are esterified with a further monohydroxyl residue [A], resulting in branched esters;
  n is 1-2;
  m is 1-4.

2. A phosphoric acid ester according to claim 1, wherein B has at least one free carboxylic acid group and a non-branching center.

3. A phosphoric acid ester according to claim 1, wherein the free carboxylic acid group(s) of B is/are fully esterified.

4. A phosphoric acid ester according to claim 1, wherein B has at least one free carboxylic acid group and at least one free carboxylic acid group is esterified.

5. A phosphoric acid ester according to claim 1, wherein B is malic acid or citric acid.

6. A phosphoric acid ester according to claim 1, wherein
  Acyl is a saturated or unsaturated fatty acid residue;
  AO is a poly$C_2$-$C_3$alkyleneglycol residue;
  HA is ε-caprolactone or δ-valerolactone;
  AA is a dicarboxylic acid;
  MO is a monoalcohol having 4 to 30 carbon atoms in the alkyl chain,
  x is 2 to 50,
  y is 2 to 50.

7. A mixture of a phosphoric acid ester according claim 1 with a phosphoric acid ester of polyC$_2$-C$_4$alkylene glycolmonoethers in weight ratio of 0.01 to 99.99.

8. A dispersant comprising a phosphoric acid ester of the formula I or salts thereof according to claim 1.

9. A sheet moulding compound (SMC) system or bulk moulding compound (BMC) system comprising a phosphoric acid ester of the formula I or salts thereof according to claim 1.

10. A water- or solvent-based coating or printing ink comprising a phosphoric acid ester of the formula I or salts thereof according to claim 1.

11. A mixture of a phosphoric acid esters according claim 7, wherein the weight ratio of phosphoric acid ester of formula 1 according to claim 1 to a phosphoric acid ester of polyC$_2$-C$_4$alkylene glycolmonoethers is 10 to 90.

12. A mixture of a phosphoric acid esters according claim 7, wherein the weight ratio of phosphoric acid ester of formula 1 according to claim 1 to a phosphoric acid ester of polyC$_2$-C$_4$alkylene glycolmonoethers is 50 to 50.

13. A dispersant comprising a mixture according to claim 7.

* * * * *

UNITED STATES PATENT AND TRADEMARK OFFICE
CERTIFICATE OF CORRECTION

PATENT NO.       : 7,595,416 B2                    Page 1 of 1
APPLICATION NO.  : 10/590467
DATED            : September 29, 2009
INVENTOR(S)      : Pirrung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 384 days.

Signed and Sealed this

Twenty-eighth Day of September, 2010

David J. Kappos
*Director of the United States Patent and Trademark Office*